United States Patent [19]

Porter et al.

[11] Patent Number: 5,030,896

[45] Date of Patent: Jul. 9, 1991

[54] D.C. RESTORE FOR A REMOTE VIDEO INTERCONNECT

[75] Inventors: Matthew A. Porter, Molalla; Jeffrey C. Bullock, Hillsboro; Arville G. Baggao, Aloha, all of Oreg.

[73] Assignee: Teketronix, Inc., Beaverton, Oreg.

[21] Appl. No.: 502,363

[22] Filed: Mar. 30, 1990

[51] Int. Cl.⁵ .............................................. H01J 29/52
[52] U.S. Cl. .................................... 315/383; 358/34
[58] Field of Search ...................... 315/383, 94; 358/34

[56] References Cited

U.S. PATENT DOCUMENTS 3,946,275  3/1976  Marino .............................. 315/383
4,722,006  1/1988  Kimura et al. ...................... 358/34
4,876,484  10/1989  Mitchell et al. ..................... 315/94

Primary Examiner—Theodore M. Blum
Attorney, Agent, or Firm—Francis I. Gray

[57] ABSTRACT

A d.c. restore circuit for a multi-channel remote video interconnect circuit is situated at the output end of the interconnect circuit for minimum capacitive loading and to reduce power requirements for a video driver at the input end of the interconnect circuit. A resistor/diode voltage divider network is coupled between the output of the interconnect circuit and the cathode or grid of a CRT, with a capacitor in series with the output of the interconnect circuit to block any d.c. component of the video signal from the video driver. A fixed voltage is applied at one end of the divider network and a variable current source is coupled to the other end. The current from the current source determines the d.c. potential at the cathode or grid.

8 Claims, 3 Drawing Sheets

D.C. RESTORE FOR A REMOTE VIDEO INTERCONNECT

BACKGROUND OF THE INVENTION

The present invention relates to video interconnects with a cathode ray tube (CRT), and more particularly to a d.c. restore circuit for a multi-channel remote video interconnect to provide a d.c. restore function at each cathode or grid of a color CRT with minimum capacitance and without increasing the power of a video drive circuit.

Prior remote video interconnects, such as shown in U.S. Pat. No. 4,876,484 issued Oct. 24, 1989 to Roy O. Mitchell et al entitled "Remote Video Interconnect and Method", have a video driver that outputs a video signal to a transmission line. The transmission line couples the video signal to a cathode or grid of a cathode ray tube (CRT) to provide a suitable display of the video signal. For a monochrome system where only a single video channel is coupled to the CRT, a d.c. restore circuit is provided at the video driver in the form of a d.c. loop that samples the output current of the video driver. However, for a multi-channel system, such as a color CRT having a separate cathode or grid for each color component red, green and blue (RGB), each channel requires a different cutoff voltage at its respective cathode or grid. In order to provide these different cutoff voltages the video drivers have to be driven at different power levels. This results in a net increase in power of greater than three times that required for a single channel.

What is desired is a d.c. restore circuit for a multi-channel remote video interconnect that does not require increased power at the video driver while maintaining low capacitive loading to the cathodes or grids of a color CRT.

SUMMARY OF THE INVENTION

Accordingly the present invention provides a d.c. restore circuit for a remote video interconnect having a flexible circuit connector on which a transmission line is formed to couple a video signal from a video driver to either a cathode or grid of a cathode ray tube (CRT). At the CRT end of the flexible circuit connector is situated a d.c. restore circuit to which the video signal is a.c. coupled by a capacitor. A pair of voltage rails together with a ground plane bracket a conductor of the flexible circuit connector to form the transmission line and to provide a d.c. voltage and a current source to the d.c. restore circuit. A resistor and a dual diode to reduce capacitance are coupled in series between the d.c. voltage and the current source, and the junction of the resistor and dual diode is coupled to the output from the capacitor. The d.c. voltage at the junction is coupled to the cathode or grid of the CRT and is determined by current from the current source.

The objects, advantages and other novel features of the present invention are apparent from the following detailed description when read in conjunction with the appended claims and attached drawing.

DESCRIPTION OF THE PREFERRED EMBODIMENT

Figure 1:
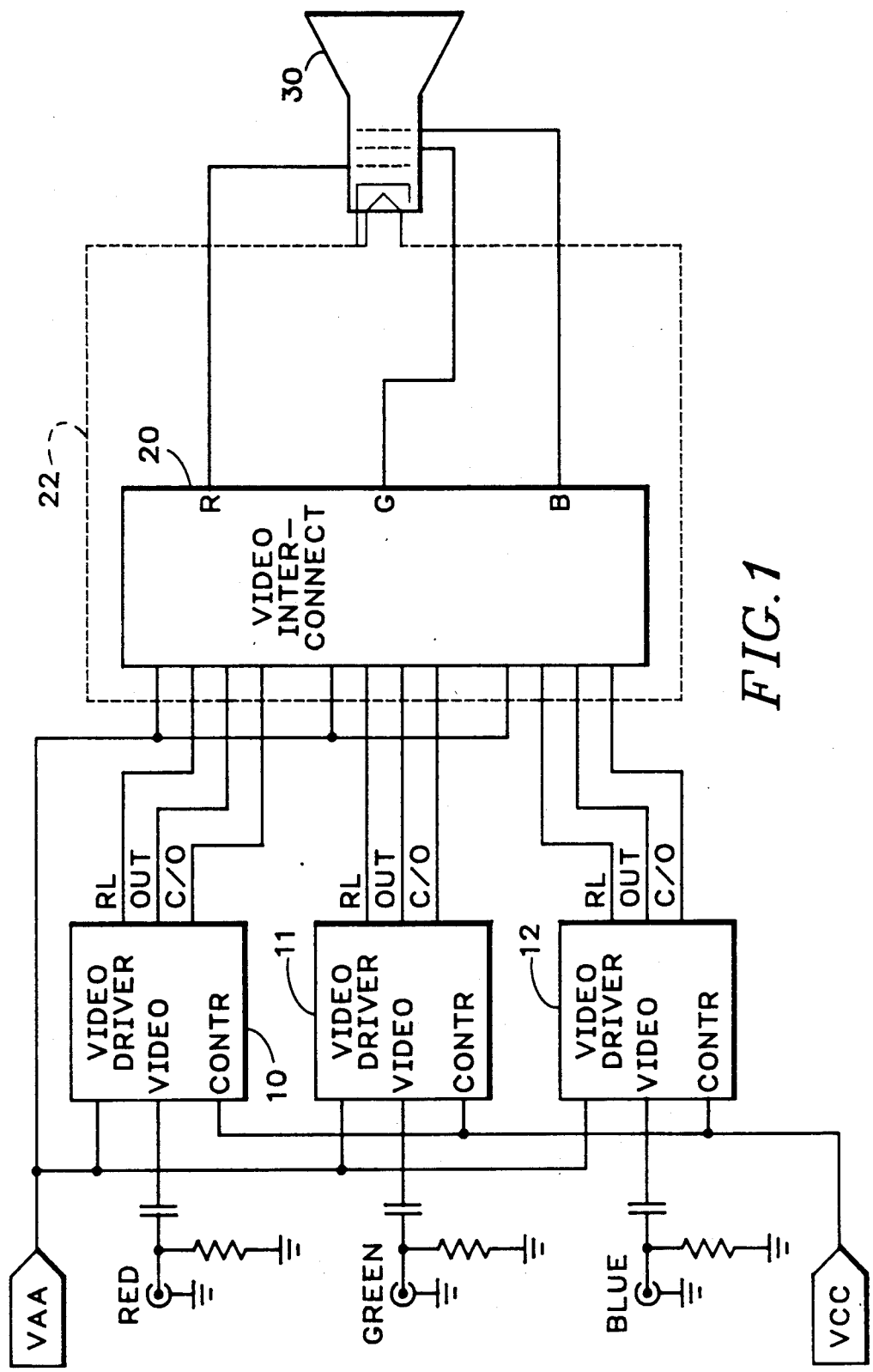
FIG. 1 is a block diagram of a drive circuit for a multi-channel CRT with a remote video interconnect according to the present invention.

Referring now to FIG. 1 red, green and blue video signals are input to respective video drivers 10–12 together with a relatively high voltage bus VAA and a contrast control bus VCC. The outputs OUT of the video drivers 10–12 are input to a remote video interconnect circuit 20 that is formed on a flexible substrate 22. Also input to the interconnect circuit 20 are the high voltage bus VAA and respective brightness control voltages C/O. A return line RL for each video driver 10–12 also is connected between the drivers and the interconnect circuit 20. As shown in U.S. Pat. No. 4,876,484, referred to above and incorporated herein by reference, the video drivers 10–12 include impedance matching circuits between the video amplifiers and the respective inputs of an output transmission line and the respective outputs of a return transmission line together with respective terminating resistors. The output transmission line and the return transmission line form a transmission line that couples the video signals from the respective video drivers 10–12 to the respective cathodes or grids of a cathode ray tube (CRT) 30. For the RGB multi-channel video interconnect 20 shown each channel is identical but independent of the other channels. Since the three channels are identical, only one of them will be described in detail hereafter.

Figure 2:
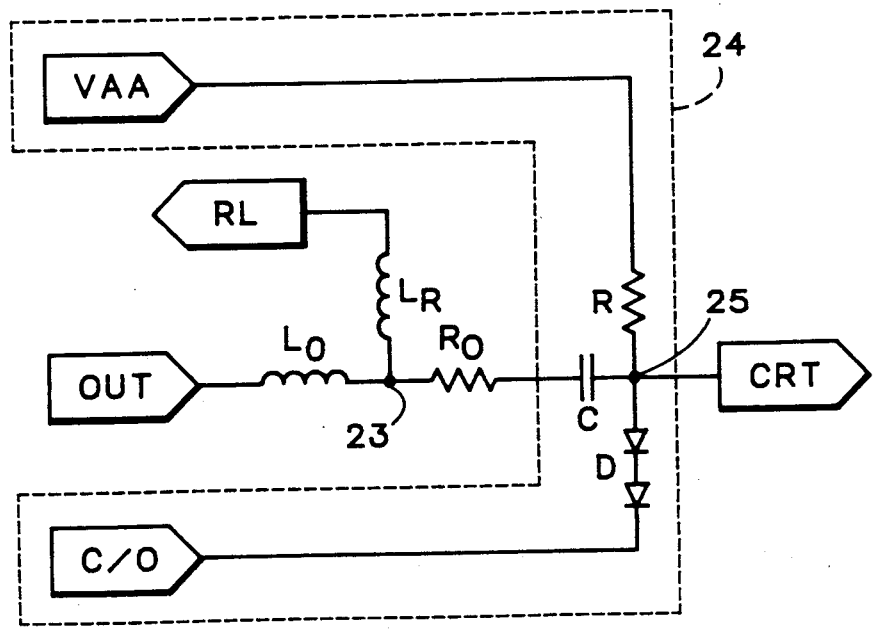
FIG. 2 is a schematic diagram of a d.c. restore circuit for the remote video interconnect according to the present invention.

At the junction of the output and return transmission lines are inductors Lo, Lr that are connected in series across the ends. At the junction 23 of the inductors is coupled an output resistor Ro to couple the video signal from the output transmission line to the cathode or grid of the CRT. Between the output resistor Ro and the cathode or grid is inserted a d.c. restore circuit 24 as shown in FIG. 2. The d.c. restore circuit 24 has a resistor R and a diode D connected in series between the high voltage line VAA and the brightness control line C/O. The junction 25 between the resistor and diode is coupled to the cathode or grid of the CRT and to one side of a capacitor C. The other side of the capacitor C is coupled to the output end of the output resistor Ro. The capacitor C acts to block any d.c. component of the video signal, and the resistor R and diode D act as a voltage divider to set the d.c. level for the cathode or grid. The level is adjusted by adjusting the current from the brightness control line C/O, which acts as a current source, to achieve the desired cutoff voltage for the cathode at junction 25. The diode D provides capacitive isolation from the brightness control line C/O.

Figure 4:
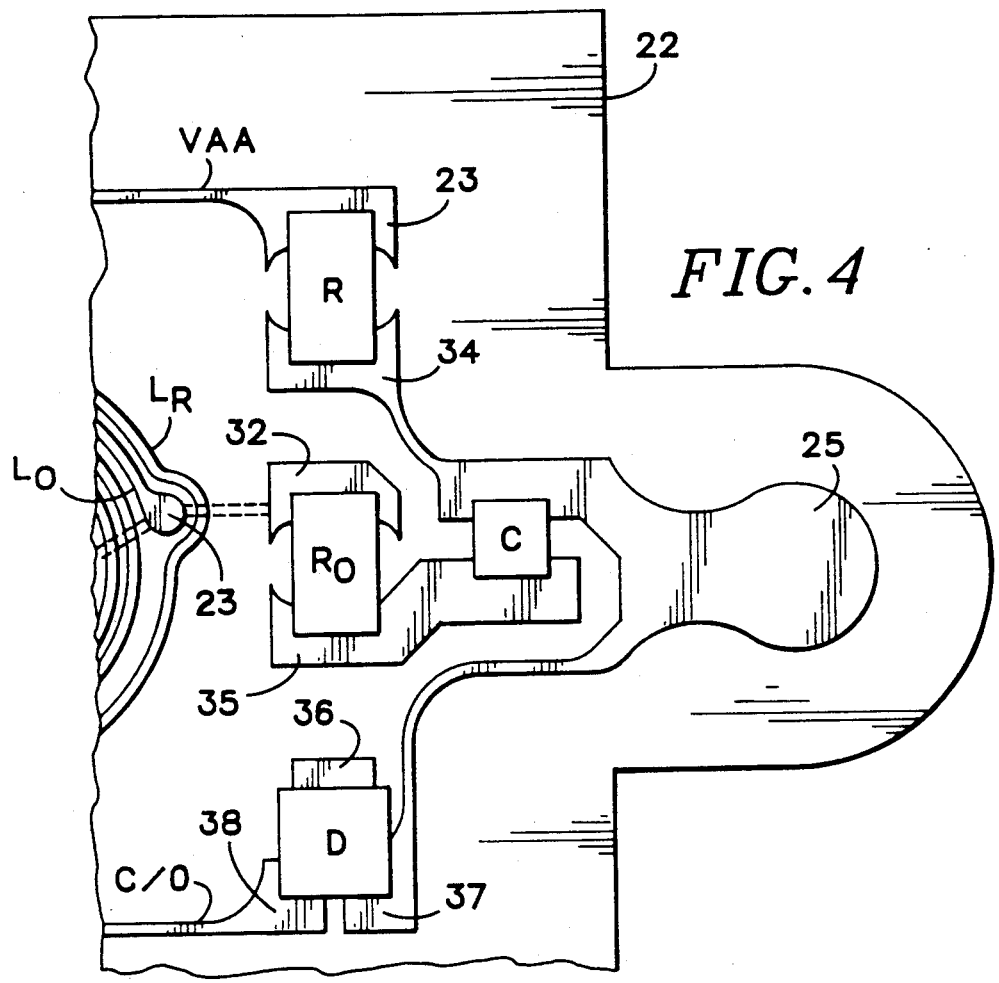
FIG. 4 is an expanded top plan view of a portion of the video interconnect circuit trace of FIG. 3 showing the component connections according to the present invention.
Figure 3:
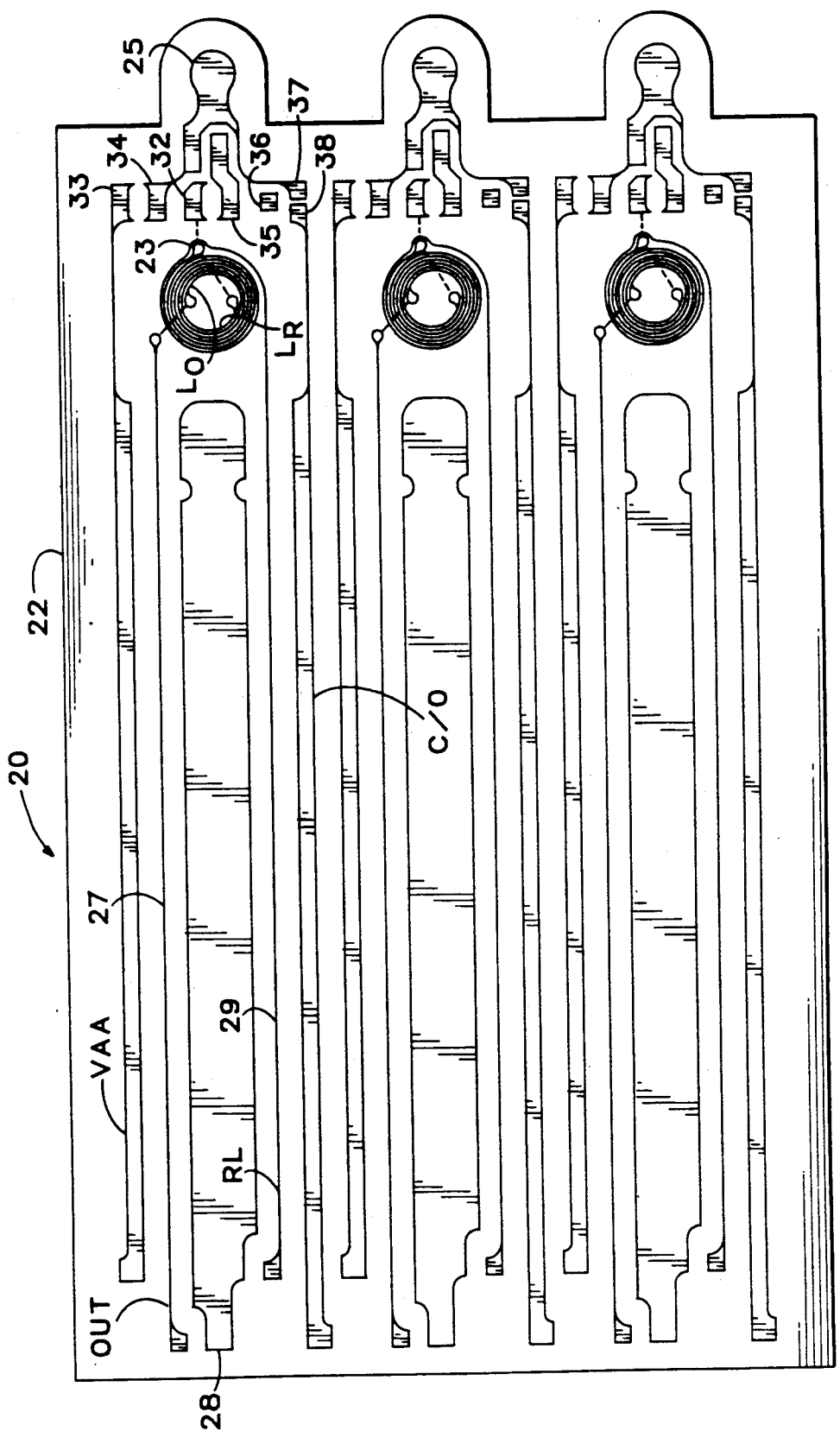
FIG. 3 is a top plan view of the video interconnect circuit trace according to the present invention.

As shown in FIG. 3 the circuit layout for the video interconnect circuit 20 includes the output transmission line OUT having a center conductor 27 to which the video signal is applied. The center conductor 27 lies between a ground plane 28 and the high voltage line VAA to form a co-planar transmission line. The return transmission line RL also has a center conductor 29 which is between the ground plane 28 and the brightness control line C/O. The inductors Lo, Lr are concentrically wound on the substrate 22 and connected to the respective center conductors 27, 29 with the junction 23 coupled to a first connection pad 32. A VAA connection pad 33, a first resistor connection pad 34, a second connection pad 35, and diode connection pads 36-38 provide points to which the various components of the circuit of FIG. 2 are connected. The first resistor connection pad and one of the diode connection pads 37 are electrically coupled with the output junction 25 to form a connector pad for coupling the video interconnect circuit to the CRT cathode or grid. Another diode connection pad 38 is electrically contiguous with the brightness control line C/O. The interconnection of the components with the flexible substrate is shown in greater detail in FIG. 4.

Thus the present invention provides a d.c. restore circuit for a multi-channel remote video interconnect circuit at the point of connection with a cathode or grid of a CRT that provides minimum capacitive loading to the CRT while keeping actual video drive power to a minimum.

What is claimed:

1. A video interconnect circuit comprising:
    a transmission line having an input end and a load end, the transmission line having an output transmission line at the input end to which a video signal is input and having a return transmission line to which a load is coupled, the junction of the output and return transmission lines being coupled to an electrode of a cathode ray tube; and
    a d.c. restore circuit coupled between the junction of the output and return transmission lines and the electrode to provide an appropriate d.c. potential to the electrode.

2. A video interconnect circuit as recited in claim 1 wherein the d.c. restore circuit comprises:
    means between the junction of the output and return transmission lines and the electrode for blocking a d.c. component of the video signal from appearing at the electrode; and
    means coupled between the blocking means and the electrode for adjusting the appropriate d.c. potential at the electrode.

3. A video interconnect circuit as recited in claim 2 wherein the blocking means comprises a capacitor coupled between the junction of the output and return transmission lines and the electrode.

4. A video interconnect circuit as recited in claim 2 wherein the adjusting means comprises:
    a voltage divider network having a junction at the electrode; and
    means for varying a current through the voltage divider network to obtain the appropriate potential at the electrode.

5. A video interconnect circuit as recited in claim 4 wherein the voltage divider network comprises:
    a resistor coupled to a voltage source; and
    a diode coupled in series with the resistor and between the electrode and the varying means.

6. A video interconnect circuit as recited in claim 5 wherein the varying means comprises a variable current source.

7. An improved remote video interconnect of the type having a transmission line coupled between a video driver and an electrode of a cathode ray tube, the transmission line including an output transmission line coupled to receive a video signal from the video driver transmission to the electrode and a return transmission line coupled in series with the output transmission line and at the end to a termination load, the junction between the output and return transmission lines being coupled to the electrode, the improvement comprising a d.c. restore circuit coupled between the junction and the electrode to provide an appropriate d.c. potential to the electrode in response to d.c. restore signals carried by the transmission line to the d.c. restore circuit from the video driver.

8. A video interconnect as recited in claim 7 wherein the d.c. restore signals comprise a fixed voltage signal and a variable current signal.

* * * * *